Patented July 16, 1946

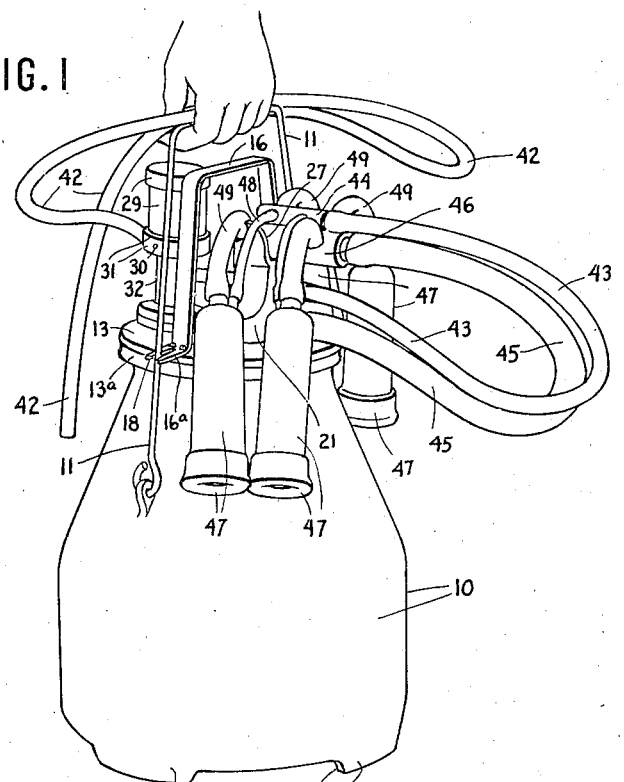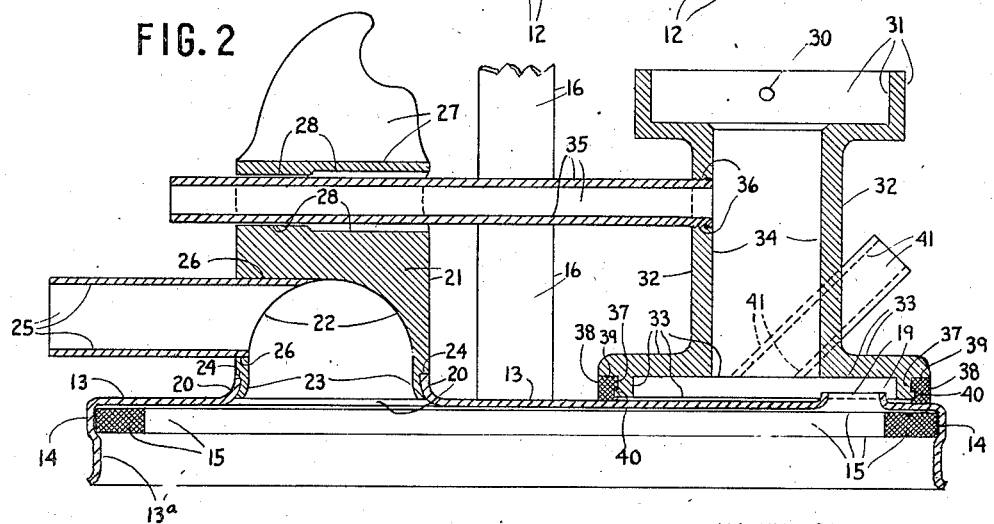

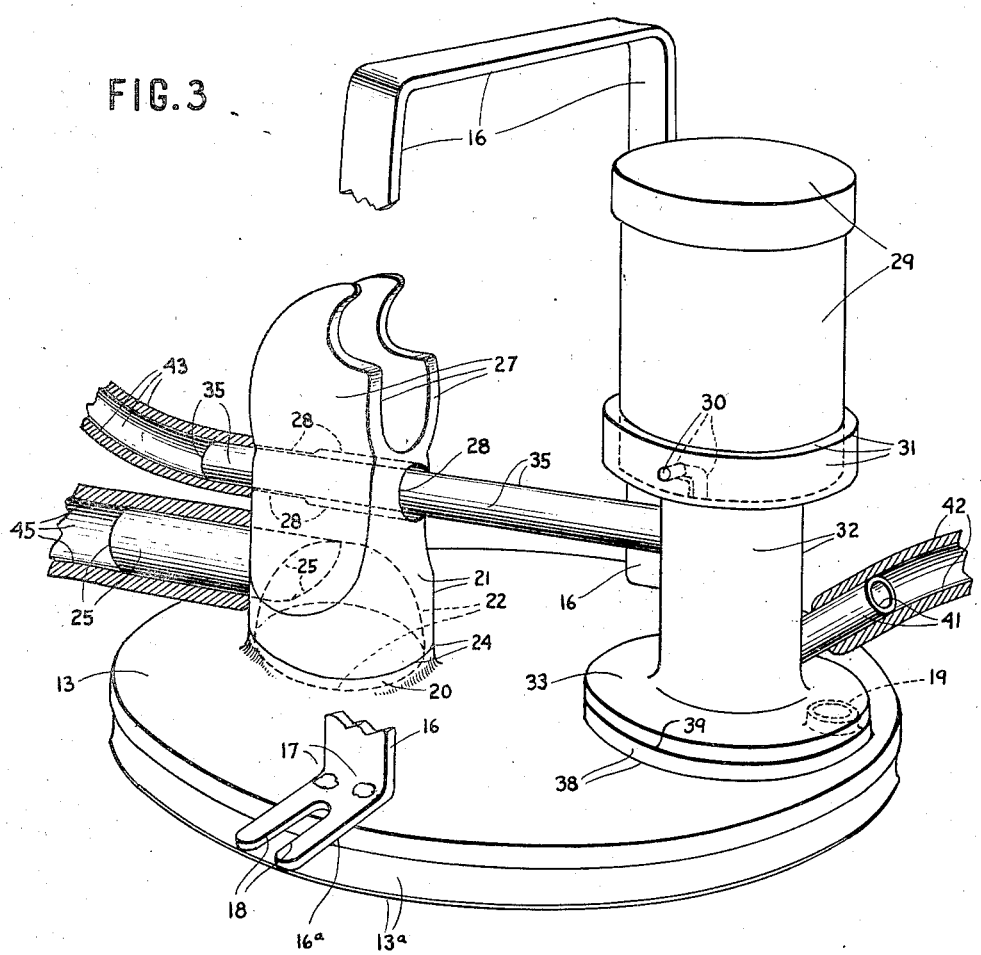
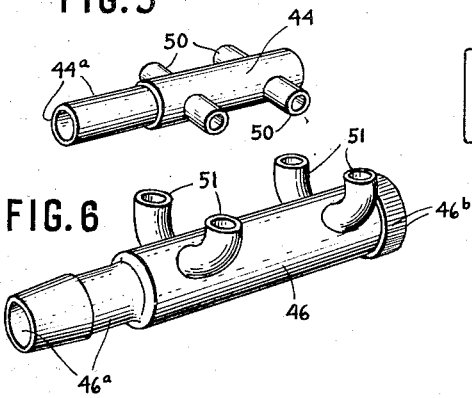
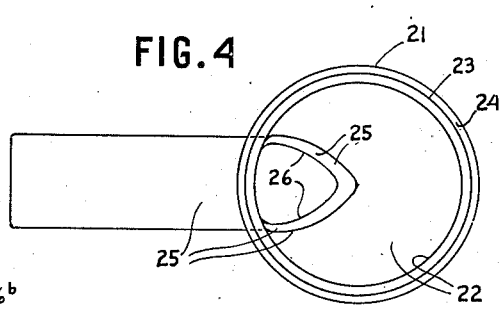

2,404,069

UNITED STATES PATENT OFFICE 2,404,069

MILKING MACHINE

Ralph L. Hinman, Oneida, N. Y., assignor to Hinman Milking Machine Co., Inc., Oneida, N. Y., a corporation of New York Application November 4, 1944, Serial No. 561,853

12 Claims. (Cl. 31—62)

The invention relates to improvements in milking machines, and particularly relates to improvements in readily portable milking machines of the vacuum type wherein a milk pail has a removable cover upon which is mounted means detachably connective with a suction line and with the teats of a cow to withdraw milk from the cow into the milk pail.

While machines of the kind above set forth are well known and have met with a considerable degree of approval and success in the art, it is recognized that the known machines have certain defects and disadvantages, particularly with respect to frequent contamination of milk in the pail, to lack of simplicity of construction, to lack of ease and rapidity of disassembly, cleaning and reassembly of the parts of the machine, to frequent failure of the machine to function during milking of a cow, and to lack of easy, rapid and cleanly handling of the machine in the performance of a series of cow milking and pail dumping operations.

The general purpose of the present invention is to provide a simple and efficient milking machine of the class set forth, and specific purposes of the invention are to provide such a machine wherein the several parts thereof may be easily, quickly and thoroughly cleaned; wherein the time required to disassemble, thoroughly clean, and reassemble the machine is reduced to a minimum; wherein the assembled machine may be handled easily and quickly and in a cleanly manner to milk cows and to dump the pail as required in milking a cow or cows; wherein liability of contamination of milk during milking of a cow and during handling the machine for installation and dumping is reduced to a minimum; and wherein liability of the machine failing to function is reduced to a minimum.

A further specific purpose of the invention is to improve the milking machine disclosed in my prior Patent No. 2,014,842, granted September 17, 1935, and in my application for patent Serial No. 546,588, filed July 26, 1944.

Other purposes and advantages of the improvements comprising the invention will appear from the following detailed description of the preferred form of milking machine embodying the invention which is shown in the accompanying drawings.

In the drawings:

Figure 1 is a perspective view showing a milking machine embodying the invention, the machine being shown detached from the source of suction and from a cow and being carried in a milker's hand;

Figure 2 is a detail vertical diametrical sectional view through the pail cover and certain connected elements of the machine;

Figure 3 is a detail perspective view showing the pail cover and connected elements of the machine;

Figure 4 is a bottom plan view of an element of the machine which comprises a claw support and a milk inlet and serves other purposes hereinafter pointed out;

Figure 5 is a perspective view of the air claw or manifold hereinafter described; and Figure 6 is a perspective view of the milk claw or manifold hereinafter described.

The preferred form of machine shown includes the milk pail 10 to which is pivoted the pail carrying bail 11, the pail being provided at its bottom with an interrupted and pendent circumferential pail-supporting flange 12 adapted to be gripped by one hand of a milker to facilitate dumping of the pail. A removable cover 13 is provided for the pail, this cover having a pendent flange 13a to receive the neck or mouth portion of the pail, said flange being formed with an internal channel 14 to retain a compressible annular sealing gasket 15 of rubber or the like which abuts the upper edge of the pail mouth when the cover is in pail closing position.

An inverted U-shaped cover lifting handle 16 has each of its side arms rigidly affixed to the top of the cover as at 17—17 by spot welding, the side arms of the handle 16 being extended horizontally outward from and beyond the top face of the cover to provide two horizontal lugs 16a which are slotted inward from their outer ends to provide two slots 18 through which the side arms of the bail 11 extend. The cover may be detached from the bail by cocking the cover at an angle to the base of the pail.

As shown in Figure 1, the machine may be lifted and carried by grasping bail 11 alone. When it is desired to open the pail to dump milk therefrom, both the bail 11 and handle 16 are grasped in one hand and the hand is contracted to slide the cover directly upward on the bail, whereupon the opened pail may be lifted by said hand and may thereupon be dumped by grasping flange 12 with the other hand and tilting the pail about the bail axis. This pail opening and dumping feature of the machine, and the detachable connection of the cover with the bail, form subject matter disclosed and claimed in my above-mentioned copending application Serial No. 546,558, filed July 26, 1944, and are, therefore, not claimed per se herein.

The top wall of the pail cover 13 has flat or planar top and bottom faces except where, at diametrically opposed points, said wall is perforated and pressed upward to form two short upstanding nipples 19 and 20 affording passages or ports through said cover wall. Nipple 19 affords an air passage through the cover and nipple 20 affords a milk intake passage through the cover. The milk intake means carried by the cover includes the nipple 20 and a fitting 21 which is fixedly and permanently secured to said nipple. This fitting has other functions which will be pointed out.

The fitting 21 has a dome-shaped, substantially hemispherical cavity 22 formed in the lower end thereof, and said fitting is exteriorly reduced at its lower end at 23 to fit within the nipple 20, the nipple and the reduced end of the fitting being tightly pressed or swaged together to immovably and permanently join the fitting, nipple and cover with the upper end of the nipple abutting under an annular shoulder 24 on the fitting, as shown. Fitting 21 is provided with a milk intake leading horizontally therethrough to the upper end of the dome-shaped cavity 22 in such manner and at such a point that milk enters said cavity substantially tangent to the hemispherical top of the cavity and is diverted downward by the cavity defining wall through the cover into the pail without abrupt change of direction. Furthermore, the intake to the cavity is of much smaller volumetric capacity than the cavity 22 and nipple 20 so that, by reason of the direction and enlarging volumetric capacity of the milk intake there is avoided to a maximum extent a highly undesirable aeration, foaming and vaporization of milk within the pail during a cow milking operation which commonly occurs in existing machines.

In the machine shown, the above described improved milk intake in fitting 21 is provided by a nipple or short length of rigid pipe 25 which extends horizontally to the cavity 22 from a point preferably slightly beyond the periphery of the pail cover, as shown, the inner end portion of this nipple having a tight driven or swaged fit in a horizontal bore 26 in the fitting 21. The inner end edge of the nipple 25 conforms with the curvature of the top portion of the dome-shaped cavity 22, and the highest part of the nipple is coincident with, or substantially coincident with, the highest part of the cavity, as shown, the nipple being immovably held to the fitting. Preferably, the axial line of the nipple 25 lies in the vertical diametrical plane through the pail cover which passes through the centers of the diametrically opposed nipples 19 and 20 formed on the cover.

At its upper end, the fitting 21 is forked or channeled to provide a claw receiving yoke 27, the longitudinal line of the channel between the arms of said yoke preferably lying in the aforesaid vertical diametrical plane, as shown. Between the yoke portion 27 of the fitting 21 and the nipple 25, a cylindrical bore 28 extends horizontally entirely through the fitting, the axial line of said bore also lying in said diametrical plane. The bore 28 is enlarged in diameter from a point within the fitting so that side of the fitting which is nearest the air passage nipple 19 formed on the pail cover. The purposes of these features of the fitting will be hereinafter explained.

The machine includes a known removable timer or pulsator unit 29 removably held seated in the known manner by bayonet joint connecting means 30 in the enlarged uper end 31 of a timer neck or pulsator fitting 32. The removable timer or pulsator unit 29 includes the working parts of the machine and forms the pulsator means of the machine and forms no part of the present invention, and detailed showing and description thereof is unnecessary, it being well known that such removable units are provided for creating the required pulsations or periodic pressure variations in the timer neck or pulsator support. Such a removable unit is disclosed in my prior patent mentioned above. However, the timer neck and its mode of attachment to the cover disclosed herein are of special and novel construction and these features, which form part of the present invention, will now be described.

The timer neck or pulsator fitting 32 is enlarged at its lower end to provide an open and downwardly facing cylindrical chamber 33 which is connected by the known vertical cylindrical piston valve bore 34 with the above mentioned enlarged cylindrical upper end 31 of said fitting. A rigid air pipe or elongate nipple 35 leads horizontally from bore 34 near the upper end of said bore, one end of this air pipe or nipple being threaded in a threaded aperture 36 in the fitting 32. The enlarged cylindrical lower end of the fitting is exteriorly reduced at 37 to receive the upper end of a rubber or other compressible annular gasket 38, the upper edge of which underlies an annular shoulder 39 on the fitting and the lower edge of which projects below the lower end of the fitting and is adapted to seat on the flat top face of the pail cover. Preferably, the gasket 38 is elastically interlocked with the reduced end of the fitting, as shown in Figure 2, by providing a narrow and horizontal annular flange 40 at the lower end of the fitting. In the assembled condition of the machine, the inner vertical wall of the cylindrical chamber 33 abuts, or substantially abuts, the air nipple 19 on the cover, and the pipe or nipple 35 extends entirely through bore 28 in fitting 21 and about a half inch beyond the latter. The major diameter of pipe 35 is slightly less than the smaller diameter of the two-diameter bore 28 in fitting 21. The larger diameter portion of bore 28 is nearest the timer neck or pulsator unit. The proportions of the parts are such that fitting 32 and its connected elements can be detached by drawing the fitting toward the right as viewed in Figure 2 until the left hand end of the pipe 35 is in the larger part of bore 28, and then cocking the fitting and further withdrawing the cocked fitting toward the right over nipple 19.

Fitting 32 is formed with a short, and preferably integral, air nipple 41 opening downward into chamber 33 through the top of said chamber near the periphery of said chamber at a point which is remote from and out of line with nipple 19 when the fitting is assembled in the machine. The relative diameters of bore 34, chamber 33 and nipple 19 are such that nipple 19 is entirely out of register with the piston valve bore 34 in the assembled condition of the machine. In the assembled condition of the machine, the lower end of chamber 33 is closed by the top wall of the cover except for the passage through the nipple 19, which nipple extends above the top face of the cover so as to form with said chamber a trap for any moisture which may enter the chamber.

The usual air suction hose 42, ordinarily about 5 or 6 feet long, has one end thereof slipped on nipple 41 for connection of the other end of said hose with a suitable source of suction, such, for example, as a stall cock of a main air suction line in a milking barn. The usual short air hose 43 has its opposite ends slipped on the outer end of pipe 35 and on the reduced open end portion 44a of the usual air claw or rigid air manifold element 44 of the machine, the other end of this air claw being closed as usual. The usual short milk intake hose 45 has its opposite ends slipped on the milk intake nipple 25 and on the reduced open end portion 46a of the usual milk claw or rigid milk intake manifold 46 of the machine, the other end of this milk claw being closed as usual, preferably by the known removable closure plug or cap 46b. The machine includes the usual four suction teat cups 47 for connection with the teats of a cow, each such cup having the usual short air line or hose 48 and usual short milk line or hose 49 leading therefrom. The air claw has the usual four nipples 50 leading thereinto and to which the air hoses from the teat cups are connected. The milk claw has the usual four nipples 51 leading thereinto and to which the milk hoses from the teat cups are connected.

A feature of the improved machine resides in pushing the hose 43 on the outer end of pipe 35 until the end of the hose abuts, or substantially abuts, the fitting 21 as shown in Figure 3 to thereby prevent accidental movement of the fitting 32 toward the right, while nipple 19 prevents movement, or any substantial movement, of the fitting 32 toward the left, as the machine is viewed in Figure 3.

The loose engagement of pipe 35 in bore 28 of the fitting 21 prevents any substantial up and down accidental movement of fitting 32 as well as any substantial accidental movement of said fitting 32 horizontally in a direction transversely of the pipe 35 and bore 28. This loose engagement of pipe 35 in the smaller portion of bore 28 does, nevertheless, permit slight compression of gasket 38 while the machine is subject to suction to permit the fitting 32 to be drawn down by suction in the pail to insure a tight seal between the cover and fitting during a milking operation. Suction in the pail will draw the cover down to tightly seal the pail during milking and will also, as usual, induce milk flow from the teat cups to the pail.

The milk inlet 25—22 enables milk to enter the pail with a minimum of splashing and foaming and also with a minimum of frictional resistance permitting successful operation of the machine with minimum applied suction. The reduction in splashing and aeration of milk and in applied suction, together with the offset arrangement of nipple 19 relatively to bore 34 of the pulsator neck precludes access of milk or milk laden bubbles from the pail into said bore 34 to the working elements of the removable timer unit 29, which access of milk to such working elements has been a source of stalling or stoppage of proper functioning of known machines. The likelihood of sucking any substantial amount of milk into the main air line is also substantially prevented.

The moisture trapping means afforded by chamber 33 and nipple 19 prevents in a very simple and effective way, without the use of valves or extra moving parts, contamination and dilution of milk from water which frequently gets in the air lines of milking machines and in the main suction lines of milking barns from condensation and other causes.

The fitting 21 also provides a convenient support for the teat cups, the milk and air claws, and the hose lines extending between said claws and the teat cups and the pulsator and milk inlet. The fitting 21 is located at one side of the slidably and separably interlocked pail bail and pail cover handle, while the pulsator means is located at the opposite side of said bail and cover handle. When the machine is disconnected from a cow and a source of suction for transportation, the milk claw is laid in yoke portion 27 of fitting 21, as shown in Figure 1, and the air hose 42 is held in the hand grasping the bail of the pail. By lifting the cover of the disconnected machine as hereinbefore described, and tilting the pail toward the left as viewed in Figure 1, it will be noted that the pail may be dumped with the teat cups, etc., clear of the stream of milk issuing from the pail.

It will be noted that the machine above described consists of separable units so connected that the machine may be almost instantly disassembled without the use of tools, that the separably connected parts are each so constructed that they may be easily and quickly and thoroughly cleaned, that there is a marked absence of dirt collecting threaded and like joints between the separable parts, and that the pulsator means is so detachably held to the cover that said means in milking action of the machine is completely or substantially completely insulated from sound vibration transmitting connection between the pulsator means and the remainder of the machine, so that the machine will be quiet in operation.

It will also be noted that the construction is such that the machine may be expeditiously handled and used for milking and milk dumping in a manner conducive to extreme purity of ultimate milk supply.

It will also be noted that the cover and fixedly attached parts are of such construction as to facilitate quick and thorough cleaning thereof; that the milk intake through the claw support and cover may be quickly and thoroughly cleaned; and that the detachable timer neck assembly may be quickly and thoroughly cleaned.

I claim:

1. A vacuum type milking machine of the kind wherein teat cup air lines and a main suction air line are connected by two hoses to two air conduit nipples of pulsator means mounted on a milk receptacle cover which has an upstanding air conduit nipple affording communication between a milk receptacle and the pulsator means, characterized by said receptacle cover having fixedly held thereto rigid upstanding means provided with a substantially horizontal bore extending therethrough, by the pulsator means carrying at the lower end thereof a compressible gasket which extends below the lower end of said pulsator means and is contactively seated on the cover around said upstanding cover nipple, and by the extension of one of said nipples of the pulsator means slidably through said bore in said upstanding means with the outer end of said nipple projecting beyond said upstanding means to detachably receive one end of one of said hoses to prevent disconnection of the pulsator means from the cover while said hose is connected to said nipple.

2. A vacuum type milking machine of the class having a pail, a pail cover, and pulsator means detachably mounted on the pail cover in communication with an upstanding air conduit nipple rigid with the cover and affording an air passage through the top of the cover, wherein the cover has fixed thereto upstanding means provided with a substantially horizontal bore therethrough, and wherein the pulsator means is seated on the top of the cover around said nipple and has an air conduit nipple affording communication from a suction line to the pail through said pulsator means and upstanding nipple and also has an air conduit nipple affording communication between the pulsator means and teat cup air lines of the machine, said last mentioned nipple extending through said bore in said upstanding means and having fitted thereon at the outer end thereof an air hose leading from the teat cup air lines with said upstanding means and pulsator means respectively substantially in contact radially of the cover with said fitted end of said air hose and with said upstanding nipple on the cover.

3. A vacuum type milking machine of the class set forth, comprising a pail, a pail cover provided with an air passage through the top thereof and with an upstanding milk inlet fitting, pulsator means seated on the cover around said air passage and having a rigid projecting part thereof removably inserted substantially horizontally through said milk inlet fitting, teat cups, and means forming air and milk lines connecting the teat cups with the pulsator means and milk inlet respectively, the air line forming means including a part detachably held to the outer end of said rigid part of said pulsator means in substantial engagement with said fitting to prevent accidental detachment of the pulsator means from said cover, said milk inlet fitting having a milk inlet passage therethrough for flow of milk from the teat cups into said pail and also having means adapted to receive and support said connections between the teat cups and the pulsator means and milk inlet fitting when the teat cups are detached from a cow.

4. A vacuum type milking machine of the class set forth wherein milk and air lines from teat cups are connected to milk and air claws respectively connected by a milk hose and an air hose with a pail cover carried milk inlet device and with an air nipple of pulsator means, characterized in that said air nipple of the pulsator means extends substantially horizontally through a bore in said milk inlet device and is releasably held against withdrawal through said bore by said air hose with the pulsator means contactively seated on the pail cover.

5. A vacuum type milking machine, as claimed in claim 4, wherein said milk inlet device is forked at its upper end to provide a supporting yoke adapted to receive one of said claws to sustain the teat cups and said milk hose and air hose of the machine when the machine is disconnected for carriage.

6. In a milking machine of the class described, the combination of a pail cover having fixed upstanding means provided with a horizontal bore extending therethrough, detachable pulsator means contactively seated on said cover and having a horizontally extending air conduit nipple leading therefrom through said bore and insertive through and withdrawable from said bore, and an air hose releasably engaged with the outer end of said nipple to abut said upstanding means to prevent accidental withdrawal of the nipple through said bore.

7. In a milking machine, as claimed in claim 6, a second fixed upstanding means on the pail cover arranged to be abutted by the pulsator means to limit horizontal movement of said pulsator means over the cover in the direction axially of said bore in which said nipple is inserted through the bore.

8. A milking machine of the class described comprising, in combination, a milk pail, a carrying bail pivotally held to the pail, a pail cover movable to open and close the pail and having means slidably engaged with the sides of the bail above the pivotal axis of the bail to maintain the bail upright when the cover is closed and to permit opening and closing of the cover, air and milk claws, teat cups having air and milk lines connected with said claws, a milk hose leading from the milk claw, an air hose leading from the air claw, a combined claw support and milk inlet fixedly held to the cover, said milk hose being connected to said combined claw support and milk inlet, said combined claw support and milk inlet having a forked upper end for claw reception when the teat cups are disconnected from a cow, pulsator means contactively seated on the cover, said pulsator means and combined claw support being located at opposite sides of the plane of the bail when the cover is in pail closing position, said air hose and pulsator means being connected by a rigid air pipe which extends horizontally and slidably through a horizontal bore in the combined claw support and milk inlet and is secured to the pulsator means for detachment with the latter from the machine, said cover having means providing an air passage therethrough between the pail and pulsator means, said pulsator means having an air nipple leading therefrom for connection of a suction hose to said nipple, and said cover having affixed rigidly thereto a lifting handle located within the confines of the bail.

9. A milking machine as claimed in claim 8, wherein the means providing an air passage through the cover comprises a nipple projecting upward from the cover, and wherein the pulsator means includes a hollow cylindrical fitting enlarged below said rigid air pipe to provide an air chamber which is of substantially greater diameter than said upwardly projecting nipple and encircles said nipple with said nipple located adjacent the periphery of said chamber to both limit protrusion of said rigid air pipe through said bore and to locate out of register with said nipple that portion of the bore of said cylindrical fitting which opens into the chamber.

10. A milking machine of the class having pulsator means which includes a detachable unit for carrying a piston valve and the other working parts of the pulsator means and also includes a piston valve cylinder which is open at its lower end to an air port in a milk pail cover, which cylinder is enlarged at its upper end to receive and removably support said detachable unit and is provided with an air passage nipple leading horizontally from said cylinder for connecting said cylinder with an air hose leading from teat cup air lines of the machine, characterized by said cylinder being removably seated on the milk pail cover and having below said nipple a radially enlarged cylindrical lower end portion which carries a pendent gasket seated on the milk pail cover with the air port in the cover located within said enlarged lower end portion of said cylinder out of register with that portion of the cylinder which is located between said enlarged end portions thereof, by said cylinder having an air nipple leading from the enlarged lower end portion thereof at a point out of registry with said air port in the pail cover for connection of the latter nipple with a source of suction, and by said milk pail cover having an upstanding fitting provided with a bore through which said horizontally extending nipple loosely extends.

11. A milking machine, as claimed in claim 10, wherein the top wall of the enlarged lower end portion of said cylinder completely overlies and is spaced above the upper end of the upstanding pail cover nipple with said nipple substantially in contact with the internal periphery of said enlarged lower end of said cylinder, and wherein that nipple of the pulsator means which is connective with the source of suction leads from the top of said enlarged lower end portion of the cylinder at a point spaced around said cylinder from the upper end of the cover nipple.

12. In a milking machine of the class described, the combination of a milk pail cover having an upstanding air passage nipple, pulsator means, and a compressible gasket pendent from the pulsator means and contactively seated on the cover around said upstanding nipple, said pulsator means having a nipple for connection with an air hose leading to a source of suction and also having a nipple extending horizontally from the pulsator means for connection with an air hose leading from teat cup air lines, said milk pail cover having upstanding means rigidly held thereto and provided with a horizontal bore through which said horizontally extending nipple extends, said bore being larger in diameter than said horizontally extending nipple, and said upstanding nipple and said upstanding means being coactive respectively with an air hose attached to said horizontal nipple and with the lower end of the pulsator means to prevent substantial lateral and vertical movements of the pulsator means relatively to the pail cover and also to permit said pulsator means to seat tightly on the cover through the medium of said compressible gasket during milking action of the machine with said horizontal nipple substantially free within said horizontal bore.

RALPH L. HINMAN.